United States Patent [19]
Hara

[11] Patent Number: 5,553,317
[45] Date of Patent: Sep. 3, 1996

[54] QUADRATURE MODULATOR FOR TDMA/TDD RADIO COMMUNICATION APPARATUS

[75] Inventor: Toshihiro Hara, Tokyo, Japan

[73] Assignee: NEC Corporation, Japan

[21] Appl. No.: 946,551

[22] Filed: Sep. 17, 1992

[30] Foreign Application Priority Data

Sep. 18, 1991 [JP] Japan .................................. 3-238333

[51] Int. Cl.$^6$ .................................................. H04B 1/44
[52] U.S. Cl. .............................. 455/83; 455/76; 455/102; 370/29; 370/95.3
[58] Field of Search ........................... 455/83, 75, 78, 455/79, 86, 76, 85, 102, 109; 370/50, 32, 29, 19, 20, 80, 95.1, 95.3, 102

[56] References Cited

U.S. PATENT DOCUMENTS

| | | | |
|---|---|---|---|
| 4,430,756 | 2/1984 | Dolman et al. | 455/78 |
| 4,476,575 | 10/1984 | Franke et al. | 455/78 |
| 4,825,436 | 4/1989 | Kobayashi et al. | 370/102 |
| 4,853,972 | 8/1989 | Ueda et al. | 455/83 |
| 4,942,570 | 7/1990 | Kotzin et al. | 370/80 |
| 5,222,253 | 6/1993 | Heck | 455/78 |

FOREIGN PATENT DOCUMENTS

| | | |
|---|---|---|
| 0089649 | 3/1983 | European Pat. Off. . |
| 0375361 | 12/1989 | European Pat. Off. . |
| 0496498 | 1/1991 | European Pat. Off. . |
| 2052196 | 6/1979 | United Kingdom . |

OTHER PUBLICATIONS

"The GSM radio interface" by M. R. L. Hodges, Br. Telecom Technol. J. vol. 8, No. 1, Jan. 1990, pp. 31–43.

Primary Examiner—Reinhard J. Eisenzopf
Assistant Examiner—Philip J. Sobutka
Attorney, Agent, or Firm—Ostrolenk, Faber, Gerb & Soffen, LLP

[57] ABSTRACT

In a radio telephone apparatus of the TDMA/TDD system, signal transmission and reception are conducted by use of carriers having an identical frequency. This leads to a problem that the transmission intermediate frequency carrier and the transmission RF carrier enter the receiver section in an identical housing, thereby causing a cochannel interference. To overcome this difficulty, there is disposed a frequency division modulator including a frequency divider for dividing by four a local signal having a frequency which is four times that of the intermediate frequency to obtain a carrier having a frequency shifted from that of the local signal by 90°. Signal to be modulated is subjected to an orthogonal modulation according to the carrier wave to produce an intermediate frequency carrier. The operation of the modulator is stopped in a signal reception state to prevent the intermediate frequency carrier undergone the orthogonal modulation from being produced.

8 Claims, 5 Drawing Sheets

QUADRATURE MODULATOR FOR TDMA/TDD RADIO COMMUNICATION APPARATUS

BACKGROUND OF THE INVENTION

The present invention relates to a radio telephone apparatus, and in particular, to a radio telephone apparatus operating according to a digital radio telephone system.

DESCRIPTION OF THE RELATED ART

A mobile communication system is established on premise of utilization of frequencies as a limited resource. As a radio telephone system with increased utilization efficiency of frequency, there has been proposed a digital radio system which use time division multiple access (TDMA) and time division duplex (TDD) communication. In the TDMA/TDD system, digital communications are implemented according to the TDMA connection system in which a plurality of radio stations use a frequency based on time division and the TDD communication system accomplishing hi-directional communications usually called ping-pong communications. In mobile communications using the TDMA/TDD system, transmission and reception of signals are conducted in the ping-pong or duplicated manner by use of a frequency between a base station and a mobile telephone set in a period of time, namely, a pair of time bands assigned to a TDMA frame as a basic element for communications.

In the TDMA/TDD system using a single frequency for the ping-pong communications as above, an identical carrier frequency is employed for transmission and reception in a radio section of the apparatus, which consequently causes a problem of a channel to channel interference in a housing thereof. Heretofore, the difficulty has been coped with as follows, for example. Power to a transmission amplifier is turned off, an antenna change-over switch is arranged to prevent a transmission radio wave from entering a receiver section, or the receiver section is shielded to prevent an intermediate transmission frequency carrier and a transmission carrier from adversely influencing the receiver section.

However, according to the conventional technology, even if the preventive provisions above are effected, it has been impossible to prevent the occurrence of the channel interference within the same housing.

SUMMARY OF THE INVENTION

It is therefore an object of the present invention to provide a radio telephone apparatus of the TDMA/TDD system type capable of completely solving the problem of the occurrence of the channel interference in the same housing, thereby avoiding the problem of the prior art.

In accordance with an aspect of the present invention, there is provided a radio telephone apparatus for conducting communications in a TDMA/TDD system using carriers, wherein the carrier in a signal transmission has a frequency different from that of the carrier in a signal reception.

According to another aspect of the present invention, there is provided a radio telephone apparatus having transmitting means and receiving means for conducting communications, wherein the transmitting means includes a frequency divider quadrature modulator (at times referred to herein as a frequency division orthogonal modulator). The modulator includes an amplifier for receiving as input thereto a local signal and producing therefrom an intermediate frequency, the amplifier amplifying a carrier frequency with which the intermediate frequency is mixed, and a control terminal for stopping the output of the intermediate frequency.

According to still another aspect of the present invention, there is provided a radio communication system in which a plurality of radio stations share thereamong a frequency with respect to time for establishing a time-division multiplex connection therebetween and conduct time-division bidirectional transmissions by use of channels of the frequency respectively assigned thereto. Each of the radio station includes a transmitting section having a frequency division modulator and a transmission amplifier, a receiving section having a demodulator, and an antenna change-over switch for connecting an antenna to either one of the transmitting section and the receiving section. The radio station sets, in a signal transmission state, the switch to a side of the transmitting section and setting the frequency divider quadrature modulator of the transmitting section to an operative state, thereby emitting a transmission wave. The radio station sets, in a signal reception state, the switch to a side of the receiving section and setting the frequency divider quadrature modulator of the transmitting section to a halt state.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, the details of an embodiment of the radio telephone apparatus in accordance with the present invention are as follows.

Prior to the description of the apparatus of the embodiment, for an easy understanding of the apparatus, a radio telephone communication system of the TDMA/TDD system and a radio telephone apparatus of the prior art will be briefly described. FIG. 2 shows an example of the system configuration of the radio telephone communication system to which the TDMA/TDD system is applied, while FIG. 1 is a signal timing chart showing an example of communications between a personal station (P8) and a base station (BS).

Figure 1:
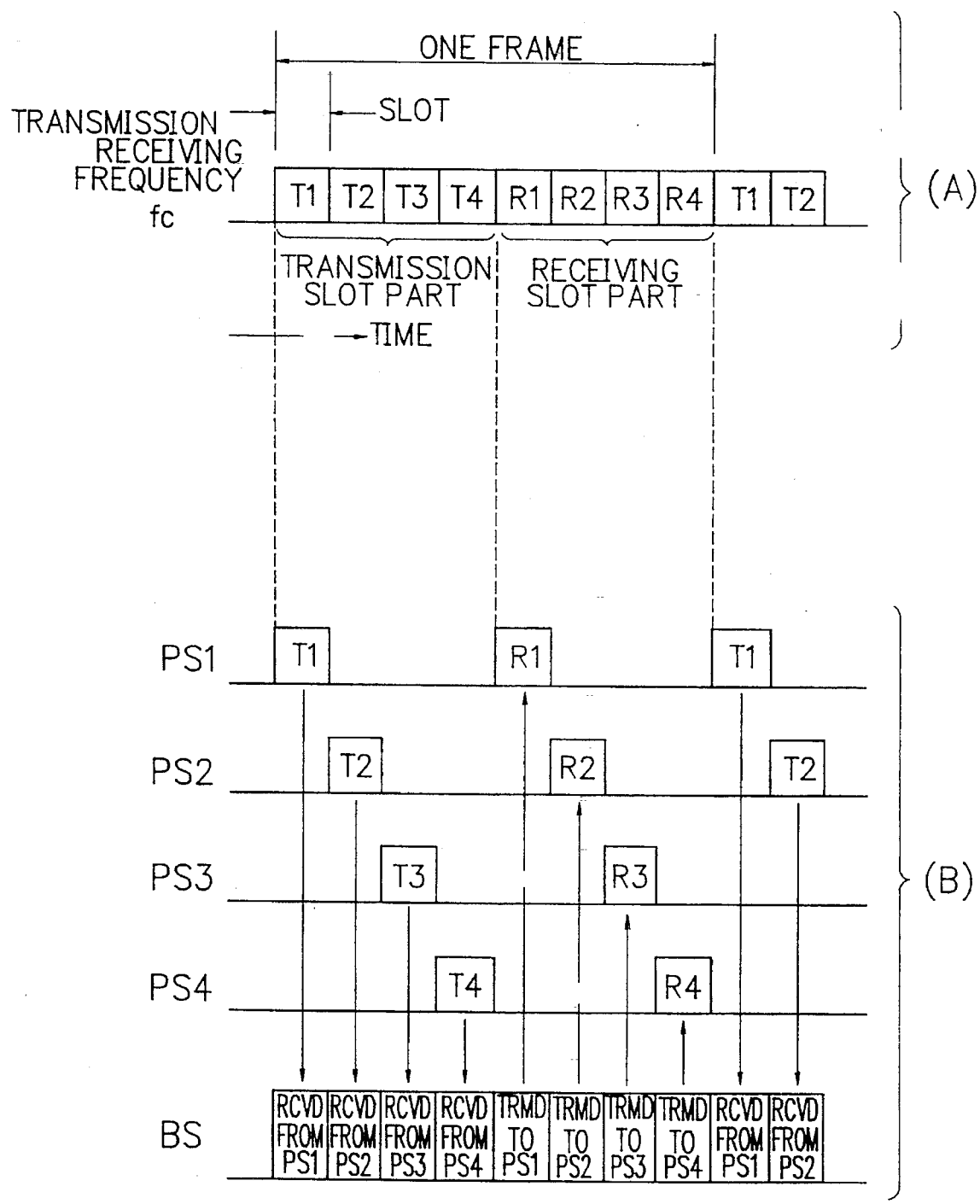
FIG. 1 is a signal timing chart showing an example of the operation of communication frames in the TDMA/TDD system and an example of communications between a private or personal station (PS) and a base station (BS) in this system.
Figure 2:
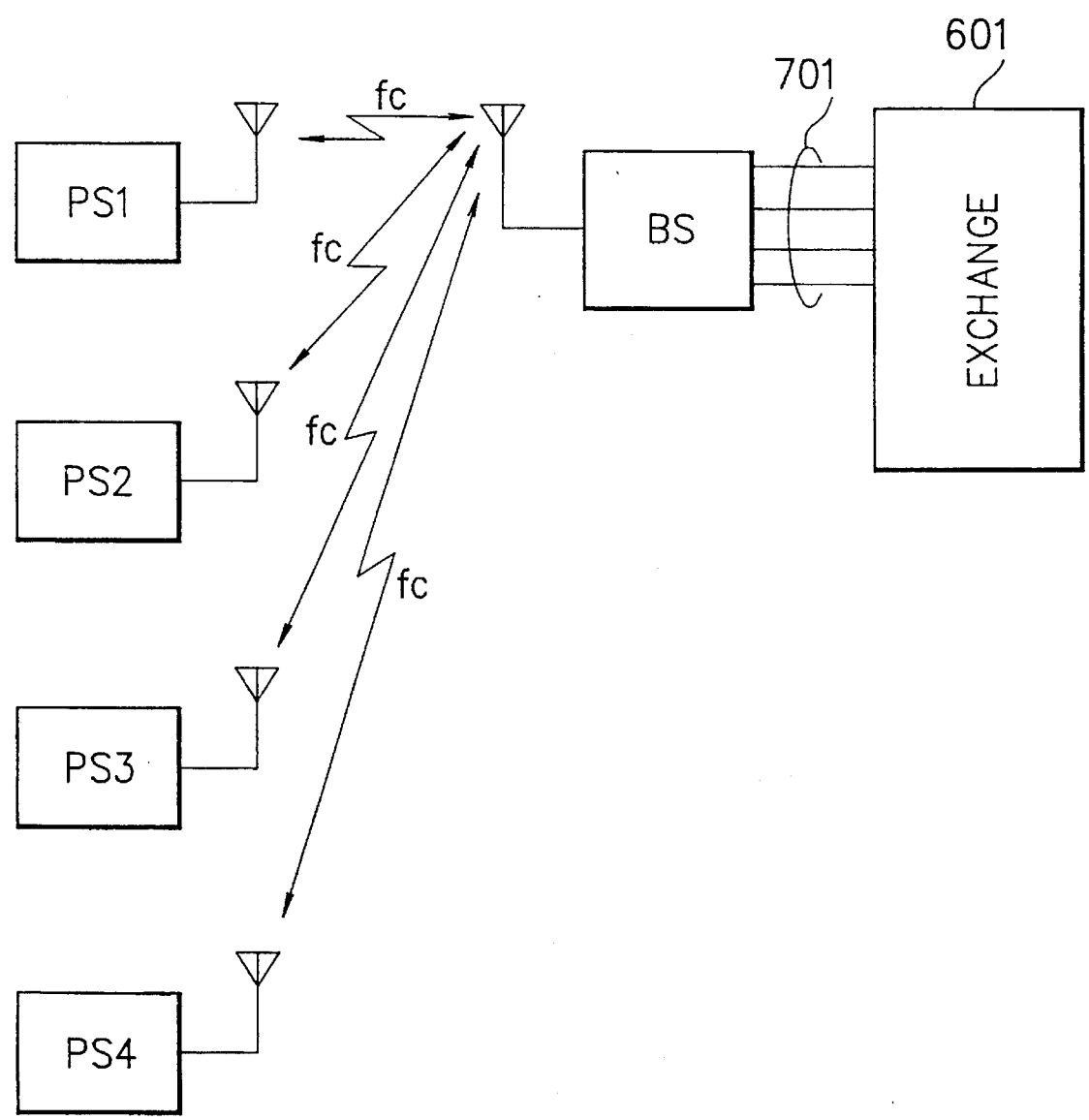
FIG. 2 is a schematic diagram showing the configuration of an example of the TDMA/TDD telephone communication system.

As shown in a signal format A of FIG. 1, according to the TDMA/TDD system, a frame at a frequency fc is partitioned into a transmission slot part or field and a reception field. Moreover, each of the fields are subjected to time division processing in accordance with the number of private stations. Namely, in this example, the transmission field is subdivided into transmission slots T1 to T4 and the reception field is split into reception slots R1 to R4 according to the time division. Each private station uses a transmission slot and a reception slot beforehand assigned thereto for communications. For example, a radio station P81 communicates the transmission slot T1 and the reception slot R1 with a base station As a result, four-channel simultaneous communication can be accomplished in a configuration of FIG. 2 including four private stations P81 to P84 and a base station BS 501 connected via subscriber lines 701 to an exchange 601. In FIG. 1, a signal timing chart B shows the operation of telephone communications simultaneously carried out via four channels between four private stations and the base station in conformity with the TDMA/TDD system. Each of the private station is a radio telephone apparatus such as a cordless telephone set, whereas the base station is a connecting device for establishing links between the exchange 601 and the private stations.

As shown in the signal timing chart B of FIG. 1, to prevent transmission waves from interfering with each other, the private stations PS1 to PS4 adopt the transmission slots T1 to T4 respectively assigned thereto in advance to conduct signal transmissions to the base station BS. When the communicating private terminals PS1 to PS4 are set to the reception state, the base station similarly sends signals thereto by use of the respective reception slots R1 to R4. As described in conjunction with FIGS. 1 and 2, the identical carrier frequency is adopted for the time-division communications in the TDMA/TDD system.

Figure 3:
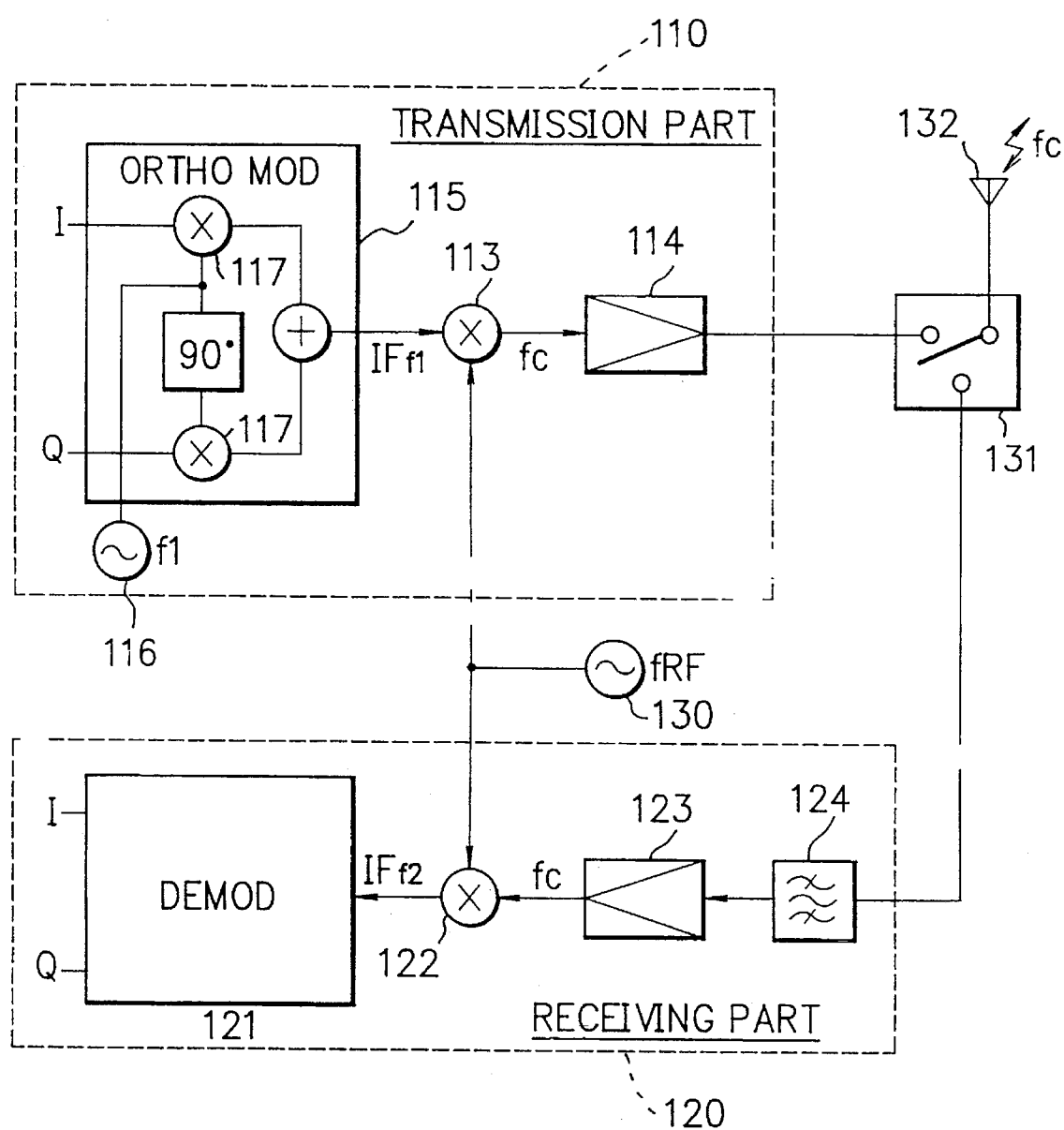
FIG. 3 is a block diagram schematically showing the constitution of a radio section in a radio telephone apparatus of the TDMA/TDD system according to the related art.

FIG. 3 shows a radio section to which the TDMA/TDD is applied according to the prior art. In this regard, in the private and base stations, the radio sections thereof have the same construction. Consequently, the configuration will be described, by way of example, for the structure of the radio section of the private section. As can be seen from FIG. 3, the radio section is primarily subdivided into a transmission part or section 110 and a reception section 120. In the radio section of each of these sections 110 and 120, there are used identical transmission intermediate frequency (IF), send/receive RF frequency, and an RF local frequency.

In the transmitter section 110, an IF orthogonal modulator 115 receives a frequency of IF local f1 signal from an IF local oscillator 116. The oscillator 116 oscillates, on receiving time-division signals I and 0 of the transmission slot T1, at a frequency identical to the intermediate frequency. The modulator 115 then carries out a quadrature modulation on the IF local f1 signal by two ring modulators 117 each including a diode, thereby outputting a transmission IFf1 signal to a transmission mixer 113.

The mixer 113 modulates the received IFf1 signal according to the frequency fRF from an RF local oscillator 130 so as to send a resultant transmission wave fc to an RF transmission amplifier 114. The amplifier 114 amplifies the signal fc to deliver a resultant signal to an antenna switch 131. In this situation, since the antenna switch 131 has been changed over to a side of the transmission section 110, a transmission wave 132 is outputted from the antenna 132. According to the TDMA/TDD system as above, since the identical carrier frequency is used for the signal transmission and reception, in order to prevent the transmission wave from directly entering the receiver section 120, the antenna switch 131 is arranged to achieve the change-over operation.

When the transmission is finished, the transmission part 110 sets the antenna switch 131 to a side of the receiving part 120. This accordingly prevents co-channel interference with any other private station and inhibits the co-channel interference in the same housing due to the transmission signal having a frequency identical to the reception signal.

Next, the receiver section 120 receives via a receiving slot R1 a reception carrier signal from the base station. The carrier signal has the frequency fc of the transmission frequency. This signal is passed through a reception RF filter 124 to obtain a signal free from noises and the like. The obtained signal is amplified by an RF reception amplifier 123 so as to send an amplified signal to a reception mixer 122. The mixer 122 demodulates the reception carrier fc according to a frequency fRF from the RF local oscillator 130, which is also used to conduct the RF modulation in the transmission. The demodulated frequency IFf2 is transmitted to a demodulator 121, which then produces therefrom a demodulated signal IFf2.

As above, in the radio section of the related art associated with the TDMA/TDD system, the identical carrier frequency fc and the same intermediate frequencies IFf1 and IFf2 are used for the signal transmission and reception. Consequently, when designing the radio section of the TDMA/TDD system, it is necessary to appropriately suppress the co-channel interference in which the transmission wave enters the receiving part in the same housing. Specifically, the co-channel interference is considered to be caused by the transmission wave entering the RF receiver unit 120 via the RE transmission amplifier 114 and the antenna change-over switch 131, the signal entering the RE receiver section 120 from the transmission mixer 113, or the transmission intermediate frequency entering the RE receiver unit 120 from the mixer 131.

Consequently, according to the related technology shown in FIG. 3, in order to decrease the co-channel interference level in the same housing, power to the transmission amplifier 114 is turned off, the antenna change-over switch 131 is provided to prevent the transmission wave from entering the receiving part 120, or the receiving section 120 is shielded to prevent the transmission signal IFf1 and the output from the transmission mixer 113 from entering the receiver part 120, thereby avoiding the interference. However, the construction of the radio section of FIG. 3 cannot completely suppress the interference and hence the reliability and performance of the radio telephone apparatus are considerably deteriorated.

Figure 4:
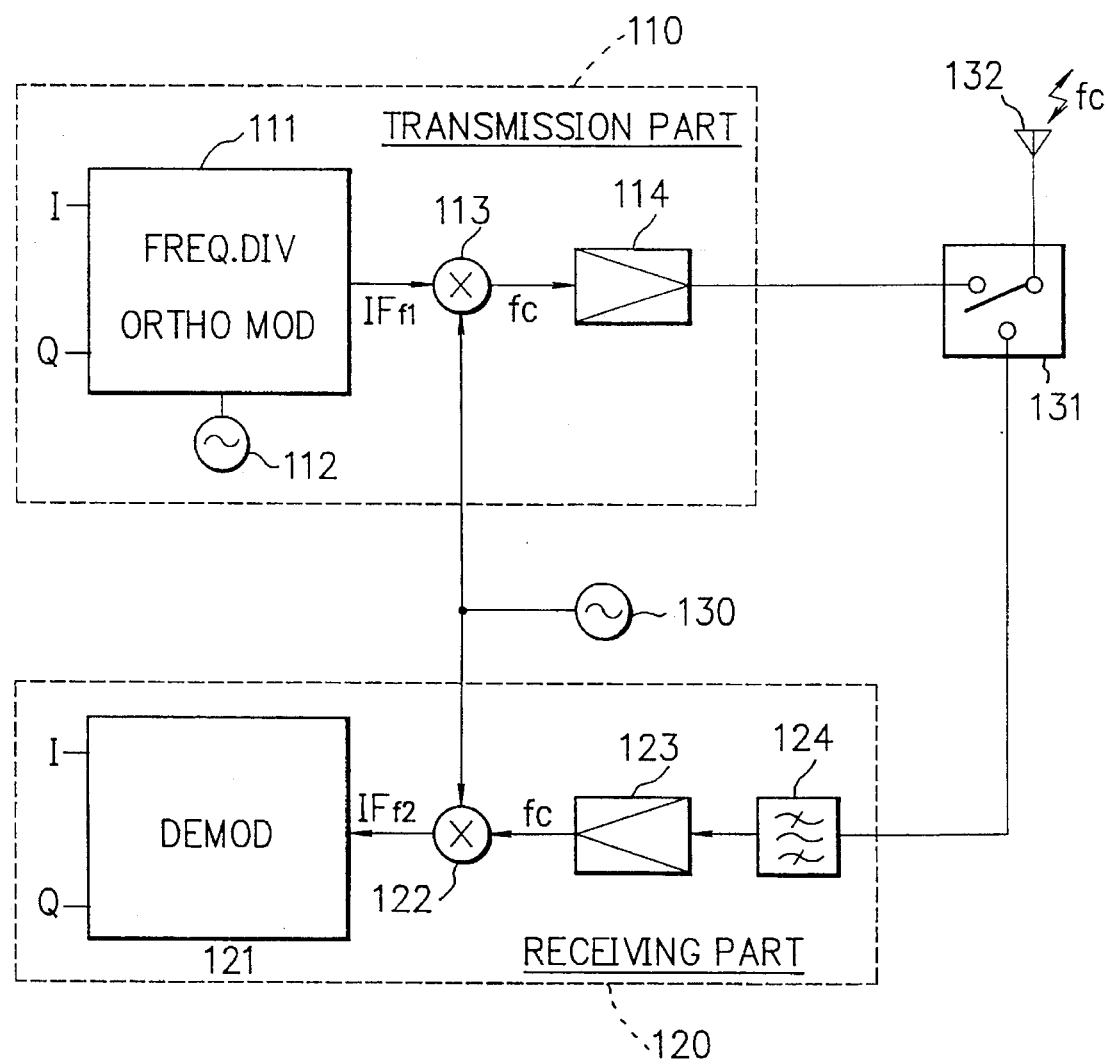
FIG. 4 is a block diagram showing the configuration of an embodiment of the radio telephone apparatus in accordance with the present invention.

Next, description will be given of an embodiment of the radio telephone apparatus in accordance with the present invention. FIG. 4 is a block diagram showing an embodiment of the radio section of the radio telephone apparatus according to the present invention. In this configuration, the same reference numerals are assigned to the same components as those of FIG. 3, and the system constitution as well as the communication sequences are the same as those shown in FIGS. 1 and 2. In this connection, the system constitution and the communication sequences shown in Figs. 1 and 2 are employed only as examples for describing the embodiment. Naturally, the number of private stations and the like are not restricted by the embodiment.

Figure 5:
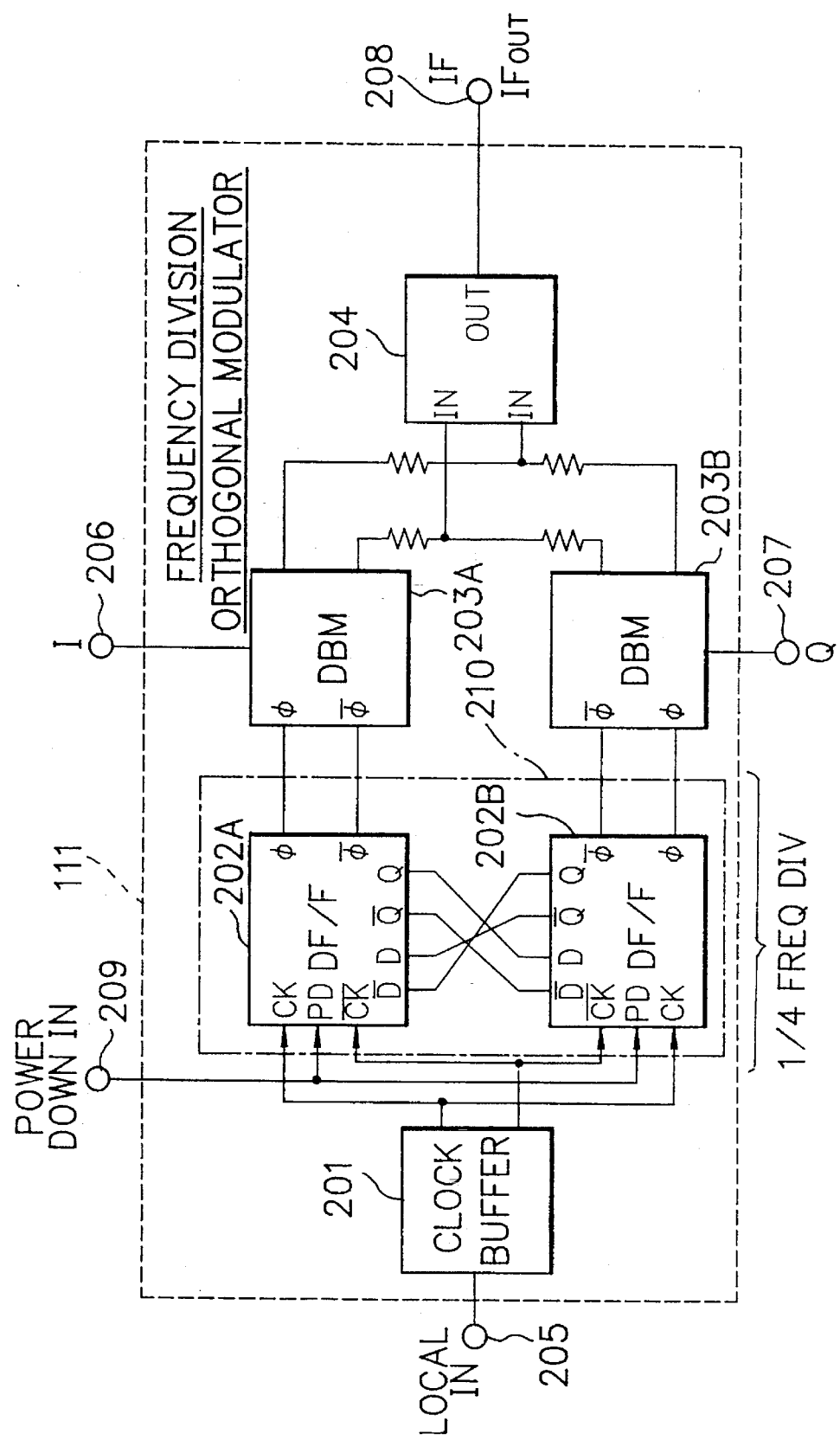
FIG. 5 is a block diagram illustratively showing the configuration of an example of a frequency divider quadrature modulator shown in FIG. 4.

According to this embodiment, in place of the quadrature modulator 115 including the ring modulators 117 shown as the related art in FIG. 3, a frequency divider quadrature modulator 111 is used when a divider (x 1/4) thereof is turned off, the quadrature modulator 111 stops outputting the intermediate frequency transmission carrier. FIG. 5 is a block diagram of the frequency divider quadrature modulator 111 using the divider (×¼).

In FIG. 5, a local input terminal 205 receives from an IF local oscillator 112 as an input thereto a signal having a frequency which is four times that of the intermediate frequency IF. A clock buffer 201 receives as a buffer input thereto a local signal from the local oscillator 112 and then supplies the divider 210 with a clock signal CK and an inverse clock signal $\overline{CK}$ having a phase which is inverse to that of the clock signal CK.

The divider 210 receives the local signal to generate therefrom an IF carrier signal having a phase shifted from that of the local signal by 90°. The divider 210 includes two D flip flop circuits 202A and 202B. Clock terminals CK and $\overline{CK}$ respectively thereof are connected to the clock buffer 201. PD terminals controlling operations of the respective circuits are connected to a power down terminal 209. In addition, terminals $\overline{D}$, D, $\overline{Q}$, and Q of the flip flop circuit 202A are connected to terminals Q, $\overline{Q}$, $\overline{D}$, and D of the flip flop circuit 202B, respectively.

Moreover, clock output terminals φ and $\overline{\varphi}$ of the flip flop 202A are respectively connected to clock input terminals φ and $\overline{\varphi}$ of a double balance mixer 203A; whereas clock output terminals φ and $\overline{\varphi}$ of the flip flop 202B are respectively connected to clock input terminals and $\overline{\varphi}$ of a double balance mixer 203B. In this embodiment, by setting the power down terminal 209 to an L level, the operation of the frequency divider 210 can be stopped. Consequently, it is possible to completely stop the generation of the signal of the intermediate frequency component IFf1 as an output from the modulator.

The double balance mixers 203A and 203B receive as inputs thereto a channel I from a terminal 206 and a channel Q from a terminal 207, respectively. Signals received from these channels are mixed therein according to the clock signal from the divider 210. Each mixer 203 has two output terminals. As shown in FIG. 5, these terminals of the respective mixers are connected to each other via two resistors. Intermediate points between the resistors are connected to associated input terminals of an adder 204. As a modulator output, there is produced from an output terminal 208 of the adder 204 a signal of intermediate frequency component IFf1.

As above, according to this embodiment, the operation of the divider 210 is supervised by changing the logic level of the power down terminal 209. Namely, when the operation of the divider 210 is stopped, the IFf1 signal interfering with the demodulator 121 is interrupted. Consequently, even when the RF local fRE is operating in the receiving state, the transmission wave fc does not appear in the output signal from the transmission mixer 131. This prevents co-channel interference of the transmission wave fc with the receiver section 120. Moreover, the original oscillation (a frequency of which is four times that of the carrier IFf1) is stopped and hence there does not exist the low-frequency component thereof, which completely suppresses the frequency IFf1. Consequently, in the signal reception, when the divider 210 of the modulator 111 is stopped so as to interrupt the IFf1 signal, the power of the RF transmission amplifier 114 is turned off, and the antenna switch 131 is set to the side of the receiver section 120, the co-channel interference is completely prevented from occurring in the housing.

In addition, according to the embodiment, since a frequency divider quadrature modulator is employed in place of a quadrature modulator, the frequency of the transmission carrier IFf1 is different from that of the reception carrier IFf2, which consequently prevents the co-channel interference from occurring.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio telephone apparatus having transmitting means and receiving means for conducting communications, wherein the transmitting means includes:

a frequency divider quadrature modulator for receiving as an input thereto a local signal, for dividing the local signal and mixing it with information signal inputted so as to produce therefrom an intermediate frequency;

an amplifier for amplifying a carrier frequency with which the intermediate frequency is mixed;

the local signal has a frequency which is four times greater than the intermediate frequency;

said frequency divider quadrature modulator comprises a frequency divider for receiving as an input thereto the local signal and generating a carrier wave having a phase shifted from that of the local signal by 90°, the frequency divider including two D flip flop circuits, and having a control terminal for terminating generation of the carrier wave.

2. A TDMA/TDD radio telephone apparatus having transmitting means and receiving means in which, in signal transmission and reception states, a respective carrier with the same frequency is used, wherein the transmitting means includes:

a frequency divider quadrature modulator means for receiving as an input thereto a local signal so as to divide the signal, and for mixing with an information signal inputted so as to produce therefrom an intermediate frequency, said local signal being of a frequency that is four times that of said intermediate frequency; and an amplifier means for amplifying a carrier frequency with which the intermediate frequency is mixed; and the frequency divider quadrature modulator means includes:

a frequency divider means for receiving as an input thereto the local signal and generating, by a dividing process, two carriers having phases shifted by 90° relative to each other;

two double-balance mixer means for mixing the output from the frequency divider with the information signal;

an adder means for adding an output from the two double-balance mixer means; and the divider means including first and second D flip flops and having a control terminal for stopping the output of the carrier wave.

3. A radio communication system in which a plurality of radio stations share thereamong the same frequency of carrier waves with respect to time for establishing a time-divider bidirectional transmissions by use of channels of the frequency respectively assigned thereto, wherein:

each of the radio station includes;

a transmitting section having a frequency divider quadrature modulator means and a transmission amplifier means;

a receiving section having a demodulator means; and an antenna change-over switch means for connecting an antenna to either one of the transmitting section and the receiving section, the frequency divider quadrature modulator means includes:

a frequency divider means for receiving as an input thereto a local signal and for generating, by a dividing process, two carriers having phases shifted by 90° relative to each other;

two double-balance mixer means for mixing an output from the frequency divider means with an information signal;

an adder means for adding the output from the two double-balance mixer means;

the local signal is of a frequency four times greater than the intermediate frequency, the radio station, in a signal transmission state, connecting the switch to a side of the transmitting section and emitting the carrier wave by control of an input from a control terminal of the divider; and the radio station, in a signal reception state, connecting the switch to a side of the receiving section and stopping the output of the carrier wave by the input from the control terminal of the divider.

4. A radio telephone apparatus for a TDMA (time-division multiple access) and TDD (time-divider duplex) digital communication system having a pair of time slots defined on a predetermined carrier frequency and assigned to the telephone apparatus, comprising:

A receiver section for receiving a reception signal in either of the time slots;

said receiver section comprising:

a first mixer for mixing the reception signal with a radio frequency signal, to obtain a first intermediate-frequency signal having a predetermined intermediate frequency; and a demodulator for demodulating the first intermediate-frequency signal, to detect a communication signal sent from the communication system;

a transmitter section for transmitting a transmission signal in the other of the time slots; and the transmitter section comprising:

a local oscillator for generating a first local signal having a local frequency different from the intermediate frequency;

a phase-shifting frequency divider means for phase-shifting the first local signal, dividing the local frequency, to obtain a pair of second local signals different in phase substantially by 90° from each other and both equal in frequency to the first intermediate-frequency signal;

a phase-modulator means for phase-modulating the second local signals with a pair of components of a communication signal to be sent to the communication system, to obtain a pair of phase-modulated intermediate-frequency carriers;

an adder for adding the intermediate-frequency carriers to each other, to obtain a second intermediate-frequency signal;

a second mixer for mixing the second intermediate-frequency signal with the radio frequency signal, to obtain the transmission signal; and a control means for enabling and disabling said phase-shifting frequency divider means.

5. The radio telephone apparatus as claimed in claim 4, further comprising:

another local oscillator for generating the radio frequency signal to be supplied to said first and said second mixer.

6. The radio telephone apparatus as claimed in claim 4, further comprising:

an antenna sensitive to the carrier frequency;

a change-over switch having a first, a second and a third terminal connected to said antenna, said first mixer and said second mixer, respectively; and said change-over switch being controlled to selectively establish an interconnection between said first and said second terminal when said phase-shifting frequency divider means is disabled, and establish another interconnection between said first and third terminal when said phase-shifting frequency divider means is enabled.

7. The radio telephone apparatus as claimed in claim 4, wherein:

said local frequency equals four times the intermediate frequency; and said phase-shifting frequency divider means comprises a pair of D flip-flops.

8. The radio telephone apparatus as claimed in claim 7, wherein:

said control means provides a digital control signal; and said flip-flops are each respectively sensitive to the control signal to start and stop demultiplying the local frequency.

* * * * *